United States Patent [19]

Fell

[11] Patent Number: 5,065,624

[45] Date of Patent: Nov. 19, 1991

[54] INSTALLATIONS FOR MEASURING LIQUID DEPTH

[75] Inventor: Roger Fell, Baildon, England

[73] Assignee: Scan Group Limited, West Yorkshire, England

[21] Appl. No.: 441,903

[22] Filed: Nov. 28, 1989

[51] Int. Cl.$^5$ .................. G01F 23/28; G06G 7/16
[52] U.S. Cl. ........................ 73/290 V; 73/292; 364/575
[58] Field of Search ............ 73/290 V; 364/575, 292

[56] References Cited

U.S. PATENT DOCUMENTS

| | | | |
|---|---|---|---|
| 3,115,615 | 12/1963 | Saper | 73/290 V X |
| 4,159,647 | 7/1979 | Paulsen et al. | 73/290 V X |
| 4,337,656 | 7/1982 | Rapp | 73/290 V |
| 4,470,299 | 9/1984 | Soltz | 73/290 V |
| 4,564,918 | 1/1986 | McNally et al. | 364/575 X |
| 4,748,846 | 6/1988 | Haynes | 73/290 V |

Primary Examiner—Daniel M. Yasich
Attorney, Agent, or Firm—Klauber & Jackson

[57] ABSTRACT

Ultrasonic depth measuring equipment comprising a sensor for emitting ultrasonic pulses in a divergent beam and for receiving the echoes of such ultrasonic pulses wherein the sensor is used in a mode such that the ultrasonic pulses are emitted upwardly through a liquid so as to be reflected from a reflecting surface, the echo being received by the sensor, the sensor being coupled to a microprocessor which is adapted to average the time taken between emissions of the pulses and the echo of the pulses being received by the sensor, and from these readings, an accurate measure of the distance between the sensor and the reflecting surface can be made.

11 Claims, 1 Drawing Sheet

INSTALLATIONS FOR MEASURING LIQUID DEPTH

This invention relates to an installation including an instrument, which primarily is a liquid depth measuring instrument, which can be used for detection, control, evaluation and the like, and also relates to a method of liquid depth measurement.

Essentially, the prime function of the instrument is to measure and monitor the depth of liquids and the objective is to provide an instrument which is accurate, reliable, robust and efficient.

The instrument is preferably ultrasonic in nature and preferably operates on the principle of the emission of ultrasonic signals and the detection of the echoes of such ultrasonic signals. The signals may be of other radiation energy such as microwave or light energy. Instruments of this nature are of course known, and have been used widely for example in floating vessels for the purposes for example of locating shoals of fish, and for measuring the depth and contour of the sea bed.

Whilst the instrument of the present invention technically could be used for measuring sea depth, its main application is for measuring the depth of shallower bodies of liquid, but its range of application is much wider insofar as it can be used for depth measurement for flowing or static bodies of liquid such as the water in rivers, liquids in processing plant, petrol and so on.

Like the known ultrasonic depth measuring equipment, the instrument according to the present invention comprises a means for emitting radiant pulses, and a means for receiving the echo of such pulses but as distinguished from the known system described above, the present invention envisages the sensor being used in a mode wherein the pulses are caused to travel upwardly through the liquid so as to be reflected from the surface of the liquid, an obstruction, or an interface of the liquid.

By this means, the depth of the liquid, or the depth of the liquid above the sensor head can be accurately measured.

It is known from the Patent Application No. 2100429A to provide an apparatus for discrimination against spurious elastic wave (for example ultrasonic) pulses in the direction of disturbed liquid interfaces or surfaces. As can be seen with reference to FIG. 2, this patent document discloses the use of an upwardly directed ultrasonic pulse through a liquid medium and, moreover, the said pulse is unrestrained. However, to detect a disturbed liquid level employs the use of two spaced transducers which inject elastic wave signals into the liquid and subsequently detect the reflections of same. The liquid level is determined by a coincidence detection technique. Thus signals emitted simultaneously from both transducers which are detected simultaneously, following reflection, by both transducers are used as a reliable means to calculate the level of the liquid.

It is also known from International Patent Specification No. WO 88/01371 to provide an ultrasonic apparatus for determining the amount of liquid in a container, particularly for precision measuring. As can be seen from FIGS. 1 and 1A of such patent document the use of an ultrasonic beam which is directed upwardly through a liquid medium is employed and the transducers are used to emit and detect the ultrasonic beam, they are connected to a microprocessor. It is also disclosed that the microprocessor performs a calculation to determine depth and since the dimensions of the tank are known, the volume of liquid fluid in the tank can be calculated by the microprocessor which supplies the information to a utilisation device which may be a recorder, a display device, or a valve, etc.

The invention as distinguished from the prior art envisages that the sensor is designed so as to emit a spreading beam of radiant energy pulses and typically the beam will be conical but in any event will be unrestrained i.e. will not be restrained so as to provide a pencil or parallel sided beam, so that pulses within the spreading beam will strike the liquid surface at different instances in time and therefore the reflected pulses will arrive at the receiver in a time sequence pattern dictated by the fact that the pulses will reach the liquid level surface and be reflected therefrom differentially and hence the travel times will be different for the various pulses or parts thereof. The sensor is coupled to a processor which is programmed to average the received pulse signals depending upon the pattern of same in order thereby to give an accurate reading of the liquid depth or the height of the liquid level above the sensor.

The pulses may be any suitable form such as microwave or light energy, but ultrasonic pulses are preferred.

By such arrangement, the sensor and instrument can be arranged to give an accurate reading of the position of the liquid level regardless of whether or not the liquid level surface may be uneven i.e. it may have waves therein, and the instrument can also be made so that reflected signals which indicate a depth which departs to a pre-determined degree from a depth represented by a mean signal time will be ignored hence the instrument can be made such that the reading given thereby is not effected for example by obstructions in the body of the liquid, or the presence in bubbles provided of course that such obstructions or bubbles do not completely obstruct the entire beam.

If the processor is set to average on the basis of the minimum travel time of the detected pulses, corresponding to the travel path which lies perpendicular to the liquid surface, then an accurate reading can be given even if the axis of the beam of pulses issuing from the sensor is arranged at an angle (within a pre-set range) to the liquid surface.

Preferably the pulses are transmitted at time intervals which are random, so that the arrival time of the pulses at the liquid surface is not synchronous with any periodic surface wave or still conditions, which could effect the accuracy of the reading.

The principles of operation of the invention will now be indicated, by way of example, with reference to the accompanying diagrams, of which:

Figure 1:
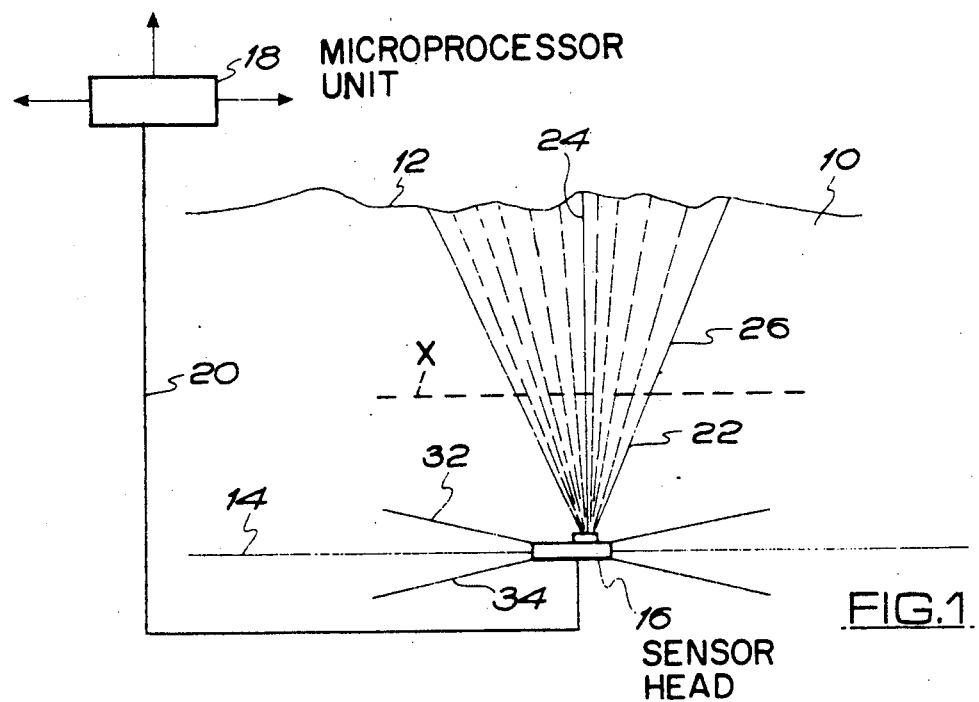
FIG. 1 shows a section through a body of liquid and a sensor of an instrument according to the present invention operatively positioned in relation thereto.
Figure 2:
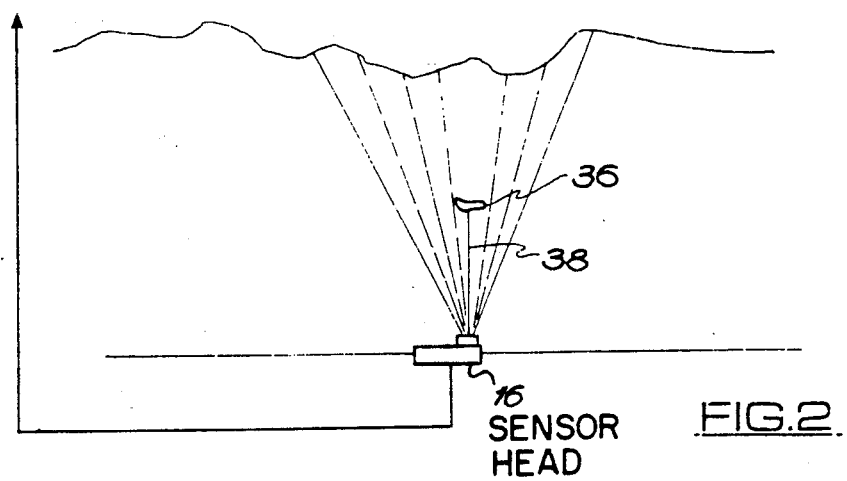
FIG. 2 shows how a suspended object in the body of liquid may affect the ultrasonic beam.

Referring to the drawings, in FIG. 1 a body of liquid 10 is required to have its depth measured and monitored. The body of liquid is shown in this example as having a wave pattern 12 on the surface thereof and in this regard the water may in fact be flowing and may be in a channel or duct, the base of which is indicated by reference 14. The instrument according to the invention comprises a sensor head 16 located on base 14, and a microprocessor unit 18 connected by cable 20 to the sensor head 16.

The sensor head 16 contains an ultrasonic emitting and receiving means, which may be typically emitting and receiving crystals of known constructions.

The sensor head 16 is designed and arranged so that the emittor will emit ultrasonic pulses in a diverging beam 22 and the beam as can be seen from FIG. 1 is unconstrained insofar as the pulses can radiate and spread freely as indicated by reference 22. The depth measurement is given by the time taken for a pulse to travel from the sensor head 16 to the level 12 and to be reflected therefrom back to the sensor head 16, but as the beam is divergent, and in fact conical, the respective pulses will in fact travel on paths of different lengths as indicated for example by two path lengths 24 and 26, and in fact there will be differential path lengths created by the waviness of the surface 12. Therefore what the receiver sees are trains of pulses arriving at different times, the pulses on the shorter paths of travel pulses arriving first, and the pulses on the longer paths of travel pulses arriving later as all pulses travel at the same speed (the speed of sound). The sensed information is fed via the cable 20 to the processor 18 which in effect pulse or echo averages the signal in order to produce a reading which is representative of the mean depth of the liquid 10. The signal which is in fact created is represented at 28 in FIG. 3, and is in the form of a histogram and the mean reading 30 is indicative of the depth of the body of liquid 10.

The apparatus has a particularly advantageous feature that the pulses are transmitted at timed intervals and said materials are random in depth, which provides that the arrival times of the pulses at the liquid surface is not synchronous with any periodic surface wave or still conditions.

The sensor 16 is accurate even if it is tilted within an angular range indicated by references 32 and 34 because the averaging of the returned pulses is based upon the minimum path length, and even if the sensor is tilted as indicated by 32 or 34, some of the beam 22 will still be travelling in a direction at right angles to the surface of the liquid 10.

It will be appreciated that the waviness of the liquid surface does not seriously affect the reading because of the multiplicity of returned pulses and the averaging effect by the processor 18 and especially because of the random isolation of the time intervals between transmitted pulses.

Additionally, if there is an obstruction such as 36 in the middle of the body of liquid 10, such an obstruction being for example a piece of solid matter or a bubble, then some of the pulses will be returned on the short path 38 and these will be received by the sensor 16 much earlier than the other reflected pulses, but such early pulses will be so deviated from the general pulse times that in fact the processor 18 can be set to ignore same, that is, the microprocessor means averages only those times which lie within a preset range. Obviously if the obstruction is so large as to block off all of the beam 22, then the processor will read the level of the obstruction rather than the level of the liquid but even if the obstruction 36 blocks off more than half of the beam 22, then the processor will still give an accurate reading of liquid level.

Figure 3:
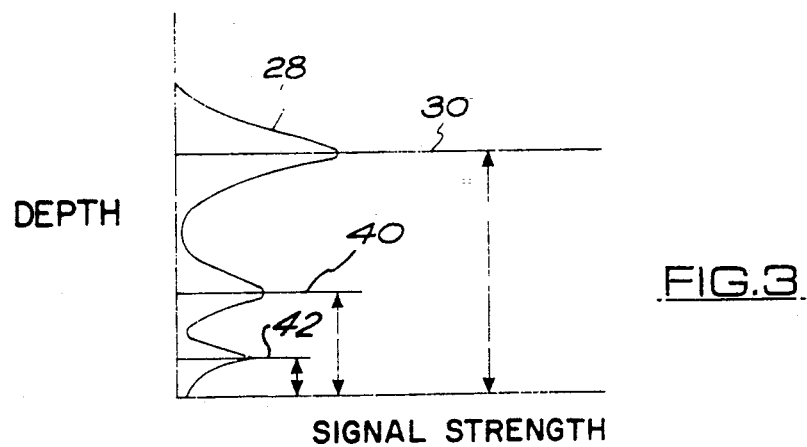
FIG. 3 is an indication of the response characteristic of the receiver of the reflected pulses.

FIG. 3 indicates at references 40 and 42 that if there is a substantial obstruction 36, for example as constituted by a shoal of fish, so that a large portion of the beam is reflected from the fish, then histogram signals 40 and 42 can be created in the output, and therefore the instrument can be used for detecting obstructions. The same effect is achieved if in fact the sensor is used where there are two immiscible liquids forming an interface, indicated diagrammatically by dashed line X in FIG. 1, as the interface will be detected by the reflection of some or all of the beam 22.

Although the sensor 16 is shown as being in the body of liquid 10, and this will be the normal arrangement, it is possible to provide that the sensor will be located to the outside of a container containing the liquid.

In use, the pulses 22 are emitted in short bursts (microseconds) at random intervals. As the pulses travel at the speed of sound, the travel time for each pulse will be of the order of milli or micro seconds and therefore the receiver computes a reading for the depth of the liquid 10 based on the pulses received. The receiver continuously repeats that analysis of the signals so that the level of the liquid can be upgraded or checked from time to time.

The depth level reading ca be utilised for depth measurement, automatic control operations, calibration, wave propagation detection or for any other suitable purposes. The processor in fact measures the travel time between pulse emission and pulse reception and as explained the problems of intermittent signal reception resulting from surface wave action is avoided by adding together received pulses to create an accumulated response and by emitting the pulses with random intervals between. Processing of this response can accurately yield the true surface position.

To take account of the variation in the speed of sound with temperature, a thermometer is built into the sensor head and automatic temperature compensation takes place in the signal processing.

A test instrument constructed to operate as above has shown itself to be outstanding in performance and reliability.

The embodiment of the invention describes the use of an ultrasonic emitter/detector system; it is not necessary that ultrasonics be used as other radiation energy such as microwave or light energy can be used.

The liquid depth can be measured to an extraordinary high degree of accuracy and the processor provides a frequency, voltage and current output proportional to depth. The processor can be connected by its serial port to external devices such as data loggers, telemetry stations, a computer or a modem for interrogation and can be controlled remotely.

The measurement can be made immune to intermittent signal drop out caused by surface wave conditions, wave action, floating debris or foaming surfaces. Where surface wave conditions exist, such as in the sea, rivers or reservoirs, the unit output will trace the median surface.

The instrument does not drift, requires no calibration or atmospheric reference and no maintenance.

Temperature compensation can be built in and as a by-product of this facility is available on the serial output port.

The ultrasonic sensor is connected via a hard wired cable to a small lightweight signal processor. The electronics are chosen for accuracy and reliability.

The sensor and processor may in one embodiment be totally sealed for life by encapsulation and can be designed to withstand the extremes of environmental conditions. With the sensor and processor being hard wired the user sees only a 6-way MIL spec connector. This provides connections for power input, shutdown, frequency, output and serial communications.

One embodiment of the instrument with a range of 25 mm to 30 m had an accuracy of better than +/−1.5 mm or 0.07% of scale reading whichever is greater, and a temperature resolution of +/−0.5° C; it required no maintenance or calibration.

I claim:

1. An installation for measuring a distance in a body of liquid in which there is defined a reflecting surface, said installation comprising:

means for emitting a divergent beam of radiant energy pulses and for receiving reflections of said pulses, said means being arranged in relation to the body of liquid such that said emitted pulses travel upwardly through the liquid so as to be reflected from said reflecting surface and said reflections of said pulses are constituted by said emitted pulses reflected from said reflecting surface; and microprocessor means for averaging the time taken for the pulses to travel from the means for emitting to the reflecting surface and back to the means for emitting so as to provide an accurate reading of the distance, said microprocessor means being coupled to said means for emitting and receiving.

2. An installation according to claim 1, wherein said means for emitting and receiving emits said pulses in bursts spaced by intervals, with the spacing of said intervals being random.

3. An installation according to claim 2, wherein said microprocessor means averages only those times which lie within a preset range.

4. An installation for measuring a distance in a body of liquid in which there is defined a surface of the liquid, said installation comprising:

means for emitting a divergent beam of radiant energy pulses and for receiving reflections of said pulses, said means being arranged in relation to the body of liquid such that said emitted pulses travel upwardly through the liquid so as to be reflected from the surface of the liquid and said reflections of said pulses are constituted by said emitted pulses reflected from said surface of liquid; and microprocessor means for averaging the time taken for the divergent pulses to travel from the means for emitting to the surface of the liquid and back to the means for emitting so as to provide an accurate reading of the distance, said microprocessor means being coupled to said means for emitting and receiving.

5. An installation for measuring a distance in a body of liquid having an interface with a second body of liquid, said installation comprising:

means for emitting a divergent beam of radiant energy pulses and for receiving reflections of said pulses, said means being arranged in relation to the body of liquid such that said emitted pulses travel upwardly through the liquid so as to be reflected from an interface between a second liquid and the first-mentioned liquid and said reflections of said pulses are constituted by said emitted pulses reflected from said interface; and microprocessor means for averaging the time taken for the divergent pulses to travel from the means for emitting to the interface and back to the means for emitting so as to provide an accurate reading of the distance, said microprocessor means being coupled to said means for emitting and receiving.

6. An installation for measuring a distance in a body of liquid having an obstruction therein, said installation comprising:

means for emitting a divergent beam of radiant energy pulses and for receiving reflections of said pulses, said means being arranged in relation to the body of liquid such that said emitted pulses travel upwardly through the liquid so as to be reflected from said obstruction in the liquid and said reflections of said pulses are constituted by said emitted pulses reflected from said obstruction; and microprocessor means for averaging the time taken for only those pulses which are reflected by the obstruction to travel from the means for emitting to the obstruction and back to the means for emitting so as to provide an accurate reading of the distance, said microprocessor means being coupled to said means for emitting and receiving.

7. A method for measuring distance in a liquid in which there is defined a reflecting surface, said method comprising the steps of:

(i) emitting radiant energy pulses in a divergent beam;
(ii) causing said pulses to travel upwardly in the liquid to strike the underside of the reflecting surface;
(iii) receiving the pulses reflected from said reflecting surface in a receiving means; and
(iv) averaging the travel time of said pulses from emission to reception to provide an indication of distance in the liquid.

8. A method according to claim 7, wherein said pulses are emitted in bursts at random intervals.

9. A method for measuring distance in a liquid in which there is defined a surface of the liquid, said method comprising the steps of:

(i) emitting radiant energy pulses in a divergent beam;
(ii) causing said pulses to travel upwardly in the liquid to strike the underside of the surface of the liquid;
(iii) receiving the pulses reflected from the underside of said surface in a receiving means; and
(iv) averaging the travel time of said pulses from emission to reception to provide an indication of distance in the liquid.

10. A method for measuring distance in a liquid in which there is defined an interface between the liquid and another liquid, said method comprising the steps of:

(i) emitting radiant energy pulses in a divergent beam;
(ii) causing said pulses to travel upwardly in the liquid to strike the underside of the interface between the liquid and said another liquid;
(iii) receiving the pulses reflected from the underside of said interface in a receiving means; and
(iv) averaging the travel time of said pulses from emission to reception to provide an indication of distance in the liquid.

11. A method for measuring distance in a liquid having an obstruction therein, said method comprising the steps of:

(i) emitting radiant energy pulses in a divergent beam;
(ii) causing said pulses to travel upwardly in the liquid to strike the underside of the obstruction in the liquid;
(iii) receiving the pulses reflected from the underside of said obstruction in a receiving means; and
(iv) averaging the travel time of only said pulses which strike and are reflected by said obstruction, from emission to reception, to provide an indication of the position of the obstruction in the liquid.

* * * * *